United States Patent [19]

Usui et al.

[11] Patent Number: 5,800,743

[45] Date of Patent: Sep. 1, 1998

[54] COOLING TOWER

[75] Inventors: Masahiro Usui, Chigasaki; Shigehira Yamamoto, Hiratsuka; Osamu Goto, Ushiku, all of Japan

[73] Assignee: Ishikawajima-Harima Heavy Industries Co., Ltd., Tokyo, Japan

[21] Appl. No.: 708,716

[22] Filed: Sep. 5, 1996

[30] Foreign Application Priority Data

Sep. 6, 1995 [JP] Japan .................. 7-229151

[51] Int. Cl.$^6$ .................................................. B01F 3/04
[52] U.S. Cl. .................. 261/153; 261/DIG. 77; 261/112.1
[58] Field of Search .................. 261/153, DIG. 77, 261/112.1

[56] References Cited

U.S. PATENT DOCUMENTS

| | | | |
|---|---|---|---|
| 2,310,121 | 2/1943 | Scherer | 261/153 |
| 3,995,689 | 12/1976 | Cates | 261/153 |
| 3,997,635 | 12/1976 | Hallgren | 261/DIG. 77 |
| 4,374,071 | 2/1983 | Regehr | 261/DIG. 77 |
| 5,468,426 | 11/1995 | Kato | 261/DIG. 77 |

FOREIGN PATENT DOCUMENTS

| | | |
|---|---|---|
| 1006482 | 9/1994 | Belgium . |
| 2319105 | 2/1977 | France . |
| 2409481 | 6/1979 | France . |
| 3-75495 | 3/1991 | Japan . |

*Primary Examiner*—Tim R. Miles
*Attorney, Agent, or Firm*—Fish & Richardson P.C.

[57] ABSTRACT

The present invention relates to a cross flow type cooling tower with which it is possible to prevent the emission of white vapor in cold weather with certainty. In order to accomplish the above object, the cooling tower of the present invention comprises: a heat dissipation unit having filling plates arranged vertically and parallel with each other so as to form dry air passages and moist air passages therebetween, each of the dry air passages and the moist air passages having inner surfaces; water supply means for supplying water to be cooled to the inner surfaces of the moist air passages for cooling the water by contact with air passing through the moist air passage; and water invasion stoppers provided at side ends of the filling plates for preventing the water flowing down the inner surfaces of the moist air passages from invading the dry air passages.

20 Claims, 2 Drawing Sheets

COOLING TOWER

BACKGROUND OF THE INVENTION

The present invention relates to a cross flow type cooling tower with which emission of white vapor from an exhaust port thereof can be prevented in cold weather.

The conventional cross flow type cooling tower has a general tendency to emit white vapor from the exhaust port thereof in cold weather, and this white vapor is liable to cause anxiety in the neighboring residents. For example, the neighboring residents are likely to believe that the white vapor pollutes the air and to feel an aversion to the white vapor; or they are likely to mistake the white vapor for smoke from a fire when the vapor reflects red light from, for example, neon signs.

Various attempts have been made in the prior art to prevent the emission of the white vapor from the cross flow type cooling tower. For example, Japanese Patent Application, First Publication No. 3-75495, discloses a cooling tower comprising an improved heat dissipation unit. This heat dissipation unit includes a plurality of filling plates vertically arranged parallel with each other so as to make fixed clearance between them, and each of the filling plates has uneven surfaces along which the water to be cooled flows down when the water is sprayed onto the heat dissipation unit. The upper ends of selected gaps formed between the neighboring filling plates are closed or are covered with cowl members which can be opened. Thus, air passages are formed for emitting only air through the heat dissipation unit. According to this configuration, because the dry air having passed through the air passages is mixed with moist air which has been in contacted with water to be cooled, it is possible to lower the humidity of the emitted air and to prevent the emission of white vapor.

However, in the cooling tower of this prior art, the water flowing down the filling plates sometimes flows behind the filling plates, and is liable to wet the inner surfaces of the neighboring air passages. This is because the water flowing down the filling plates spreads in horizontal directions by the dispersion effects of the uneven surfaces of the filling plates. If the inner surface of the air passage is wet, the air passing through the air passage will be moistened, thus, the risk arises that the effect for preventing the emission of white vapor will be hindered.

SUMMARY OF THE INVENTION

It is an object of the present invention to provide a cooling tower with which it is possible to prevent the inner surfaces of the dry air passages from becoming wet and to maintain sufficient effects for preventing the emission of white vapor.

In order to accomplish the above object, the cooling tower of the present invention comprises: a heat dissipation unit having filling plates arranged vertically and parallel with each other so as to form dry air passages and moist air passages therebetween, each of the dry air passages and the moist air passages having inner surfaces; water supply means for supplying water to be cooled on the inner surfaces of the moist air passages for cooling the water by contact with air passing through the moist air passages; and water invasion stoppers provided at side ends of the filling plates for preventing the water flowing down the inner surfaces of the moist air passages from invading into the neighboring dry air passages.

According to the cooling tower of the present invention, because the water invasion stoppers prevent the water flowing down the inner surfaces of the moist air passages from flowing into the dry air passages, it is possible to keep the dry air passages in a dry condition. Thereby, the air having passed through the dry air passages can be sufficiently dried by being heated by the inner surfaces of the dry air passages which is heated by the heat conduction from the hot water to be cooled, and the dried air is mixed with the moist air having passed through the moist air passage. Therefore, it is possible to prevent the mixed air from being supersaturated with vapor, and the emission of the white vapor from the exhaust port of the cooling tower can be prevented with certainty even when the ambient temperature is low.

The water invasion stopper can be a groove, a protrusion, or a fold extending along the side ends of the filling plates. In these cases, the water flowing towards the side ends of the filling plates can be collected by the water invasion stopper, and the collected water flows down the water invasion stopper. Therefore, it is possible to efficiently prevent the scattering of water from the heat dissipation unit which may occur accompanied with the emission of the air in the prior art.

The cooling tower of the present invention may comprise cowl members disposed on selected filling plates for selectively pouring the water into the moist air passages.

DETAILED DESCRIPTION OF THE PREFERRED EMBODIMENTS

Figure 1:
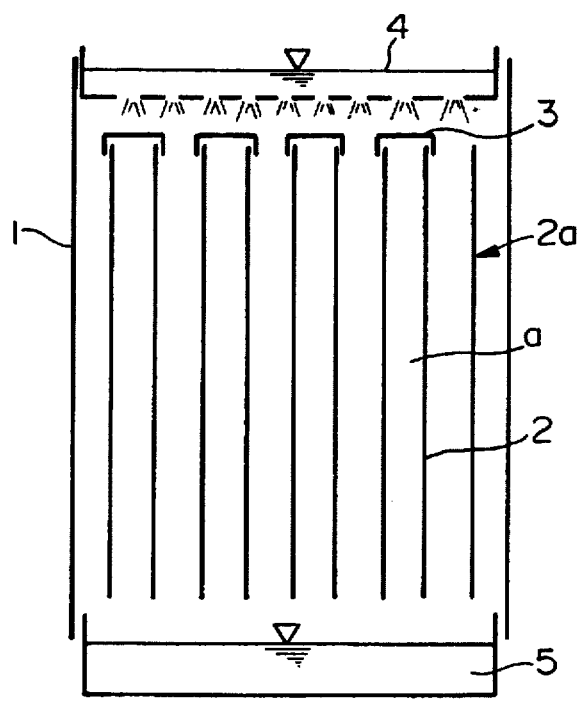
FIG. 1 is a cross section of a cooling tower according to an embodiment of the present invention.
Figure 2:
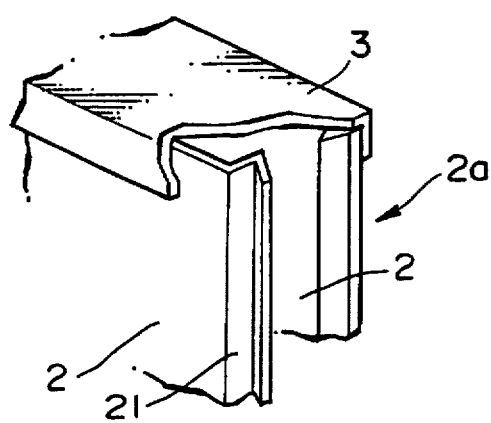
FIG. 2 is a perspective view of a part of a heat dissipation unit of the embodiment.

Referring to FIGS. 1 and 2, the best mode of the cooling tower according to the embodiment of the present invention will be explained.

As shown in FIG. 1, the cross flow type cooling tower of the present embodiment comprises a tower body 1, a heat dissipation unit 2a disposed in the tower body 1, cowl members 3 fixed on the heat dissipation unit 2a, an upper water tank 4 for supplying hot water to be cooled onto the heat dissipation unit 2a, and a lower water tank 5 provided below the heat dissipation unit 2a for receiving the water falling from the lower end of the heat dissipation unit 2a.

The upper water tank 4 is fixed inside the upper part of the tower body 1, and comprises a plurality of spray nozzles (or spray holes) provided on the bottom surface thereof for uniformly spraying hot water to be cooled onto the upper end of the heat dissipation unit 2a.

The heat dissipation unit 2a comprises a plurality of filling plates 2, having a rectangular shape, which are vertically arranged parallel with each other so as to form a constant space therebetween. Some of these spaces are used as dry air passages (a), the others are used as moist air passages, and air is supplied so that it flows horizontally through each passage. In this embodiment, the dry air passages (a) and the moist air passages are formed alternately; however, the present invention is not limited to this arrangement. Each filling plate 2 has uneven surfaces on both faces, and water to be cooled which is sprayed from the upper water tank 4 flows down the uneven surfaces; the heat exchange between the water and the air is thereby enhanced.

Above each of the dry air passages (a), cowl members 3 having an inverted gutter shape are horizontally disposed in a detachable manner on the neighboring upper ends of the filling plates 1. The cowl members 2 prevent the water sprayed from the tank 4 from falling into the dry air passages (a); however, if the cowl member 2 is removed, the corresponding dry air passage will be changed into a moist air passage, and the number of the moist and dry air passages can be adjusted. By means of adjusting the number of the dry air passages, it is possible to control the vapor concentration in the air emitted from the cooling tower so as to prevent the emission of white vapor. In general, the number of the dry air passages should be increased in cold seasons in which white vapor can be easily generated, and the number should be reduced in warm seasons.

As shown in FIG. 2, both side ends of each filling plate 2 are folded so as to have a "V" shape section in the entire length thereof, water invasion stoppers 21 are thereby formed. A water invasion stopper 21 has a groove formed on the inner surface of the moist air passage, and also has a projection protruding inside the dry air passage; however, the direction of the fold of the folded portion 21 can be reversed. The water invasion stoppers 21 prevent the water flowing down one surface of filling plate 2 from going around to the other surface of the same plate 2, thereby preventing the inner surfaces of the neighboring dry air passage from becoming wet. Also, the water invasion stoppers 21 check the water flowing towards the side ends of the filling plates 2, and let the collected water flow along the water invasion stoppers 21. Therefore, it is possible to efficiently prevent the scattering of water which is liable to be accompanied with the emission of the air in the prior art.

In the cooling tower of the present embodiment, the upper water tank 4 sprays hot water to be cooled onto the upper end of the heat dissipation unit 2a, and the hot water flows into only the moist air passages because the cowl members 3 prevent the hot water from flowing into the dry air passages. While the hot water is flowing down the filling plates 2, the hot water is cooled by the contact with the air horizontally flowing through the moist air passages, thereby generating the moist air. Simultaneously, the cowl members 3 and the filling plates 2 are heated by the hot water, and the air flowing through the dry air passages is heated by contact with the inner surfaces of the dry air passages; thereby generating the dry air. The moist air and the dry air are mixed with each other, and the mixed air is emitted from the exhaust port of the cooling tower.

In this process, the water invasion stoppers 21 prevent the water flowing down the inner surfaces of the moist air passages from going around into the dry air passages in order to keep the dry air passages in a dry condition. Therefore, the air passing through the dry air passages can be sufficiently dried, thereby preventing the mixed air from being supersaturated with vapor. Therefore, the emission of the white vapor from the exhaust port of the cooling tower can be prevented with certainty even when the ambient temperature is low.

Also, the water invasion stoppers 21 check the flow of the water towards the side ends of the filling plates 2, and lets the collected water flow along the water invasion stoppers 21. Therefore, it is possible to efficiently prevent the scattering of water from the heat dissipation unit 2a which is liable to be accompanied with the emission of the air in the prior art.

The above embodiment comprises the folded portions 21 as water invasion stoppers; however, the present invention is not limited to this construction. For example, it is also possible to form protrusions and/or grooves at the side ends of the filling plates 2 without folding the side ends of the filling plates 2. That is, the shape and construction of the water invasion stoppers 21 can be variously modified so far as the water invasion stoppers 21 can prevent the invasion of the water to the dry air passages. Furthermore, the water invasion stoppers can be formed on only one side end of each filling plate 2, or of selected filling plates 2.

Figure 3:
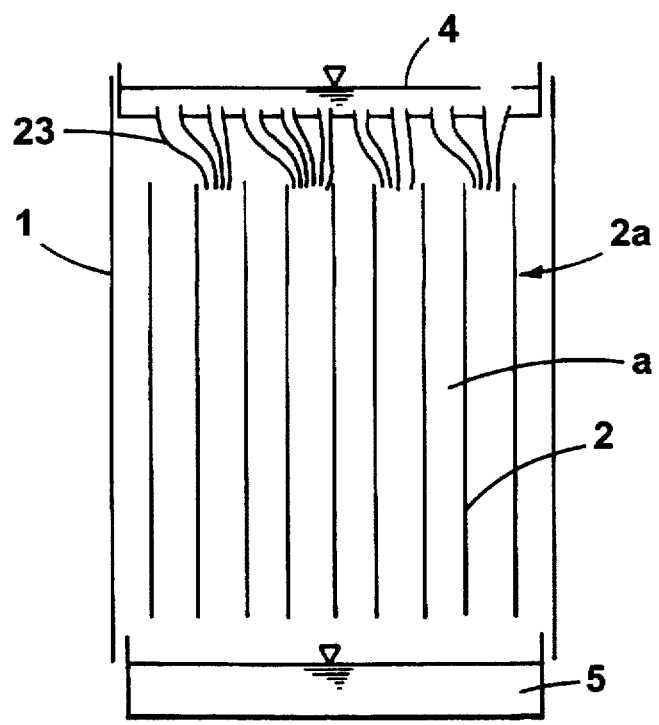
FIG. 3 is a cross section of a cooling tower according to another embodiment of the invention.

Furthermore, the cowl members 3 are not indispensable for the present invention. For example, as shown in FIG. 3, instead of the cowl members 3, it is also possible to provide adjustable spray nozzles 3 for selectively spraying the hot water only inside the moist air passages without spraying water into the dry air passages.

What is claimed is:

1. A cooling tower comprising:

a cross flow type heat dissipation unit having filling plates arranged vertically and parallel with each other so as to form dry air passages and crossflow moist air passages therebetween, each of said dry air passages and said moist air passages having inner surfaces;

water supply means for supplying water to be cooled on said inner surfaces of said moist air passages for cooling the water by contact with air passing through said moist air passages; and water invasion stoppers provided at side ends of said filling plates for preventing the water flowing down said inner surfaces of said moist air passages from invading said dry air passages.

2. The cooling tower according to claim 1, wherein each of said water invasion stoppers comprises a groove and a protrusion extending along one of said side ends of said filling plates.

3. The cooling tower according to claim 1, further comprising cowl members disposed on selected filling plates for preventing the water supplied from said water supply means from flowing into said dry air passages.

4. The cooling tower according to claim 1, wherein said filling plates have at least an uneven surface.

5. The cooling tower according to claim 1, wherein said water supply means comprises an upper water tank.

6. The cooling tower according to claim 1, wherein said water supply means comprises nozzles for supplying water to be cooled only into said moist air passages.

7. The cooling tower according to claim 1, wherein each of said water invasion stoppers comprises a fold formed at a side end of one of said filling plates so as to protrude inside one of said dry air passages.

8. The cooling tower according to claim 1, further comprising a water receiving tank for receiving water flowing down from said heat dissipation unit.

9. The cooling tower according to claim 1, wherein each of the water invasion stoppers comprises a groove extending along one of the side ends of the filling plates.

10. The cooling tower according to claim 1, wherein each of said water invasion stoppers comprises a protrusion extending along one of the side ends of the filling plates.

11. The cooling tower according to claim 10, wherein each protrusion extends toward one of the dry air passages.

12. The cooling tower according to claim 1 wherein the water invasion stoppers are provided at two side ends of each of the filling plates.

13. The cooling tower according to claim 1 wherein the water invasion stoppers are provided at one side end of each of the filling plates.

14. The cooling tower according to claim 1 wherein the water invasion stoppers are provided at side ends of selected ones of the filling plates.

15. The cooling tower according to claim 1, wherein said water supply means comprises adjustable nozzles for supplying water to be cooled only into selected ones of said moist air passages.

16. The cooling tower according to claim 1 wherein the water supply means supplies water to be cooled on the inner surfaces of the moist air passages for cooling the water by contact with air passing horizontally through the moist air passages.

17. The cooling tower according to claim 7 wherein the water supply means comprises an upper water tank, the cooling tower further comprising a water receiving tank for receiving water flowing down from the heat dissipation unit.

18. The cooling tower of claim 17 further comprising cowl members disposed on selected filling plates for preventing the water supplied from the water supply means from flowing into said dry air passages.

19. A cooling tower comprising:
a cross flow type heat dissipation unit having filling plates arranged vertically and parallel with each other so as to form dry air passages and moist air passages therebetween, each of said dry air passages and said moist air passages having inner surfaces;
water supply means for supplying water to be cooled on said inner surfaces of said moist air passages for cooling the water by contact with air passing through said moist air passages; and
grooves extending along side ends of said filling plates for preventing the water flowing down said inner surfaces of said moist air passages from invading said dry air passages and for collecting water flowing toward the side ends of the filling plates.

20. The cooling tower according to claim 19, wherein the grooves are formed on the inner surfaces of the moist air passages.

* * * * *